United States Patent Office 3,445,550
Patented May 20, 1969

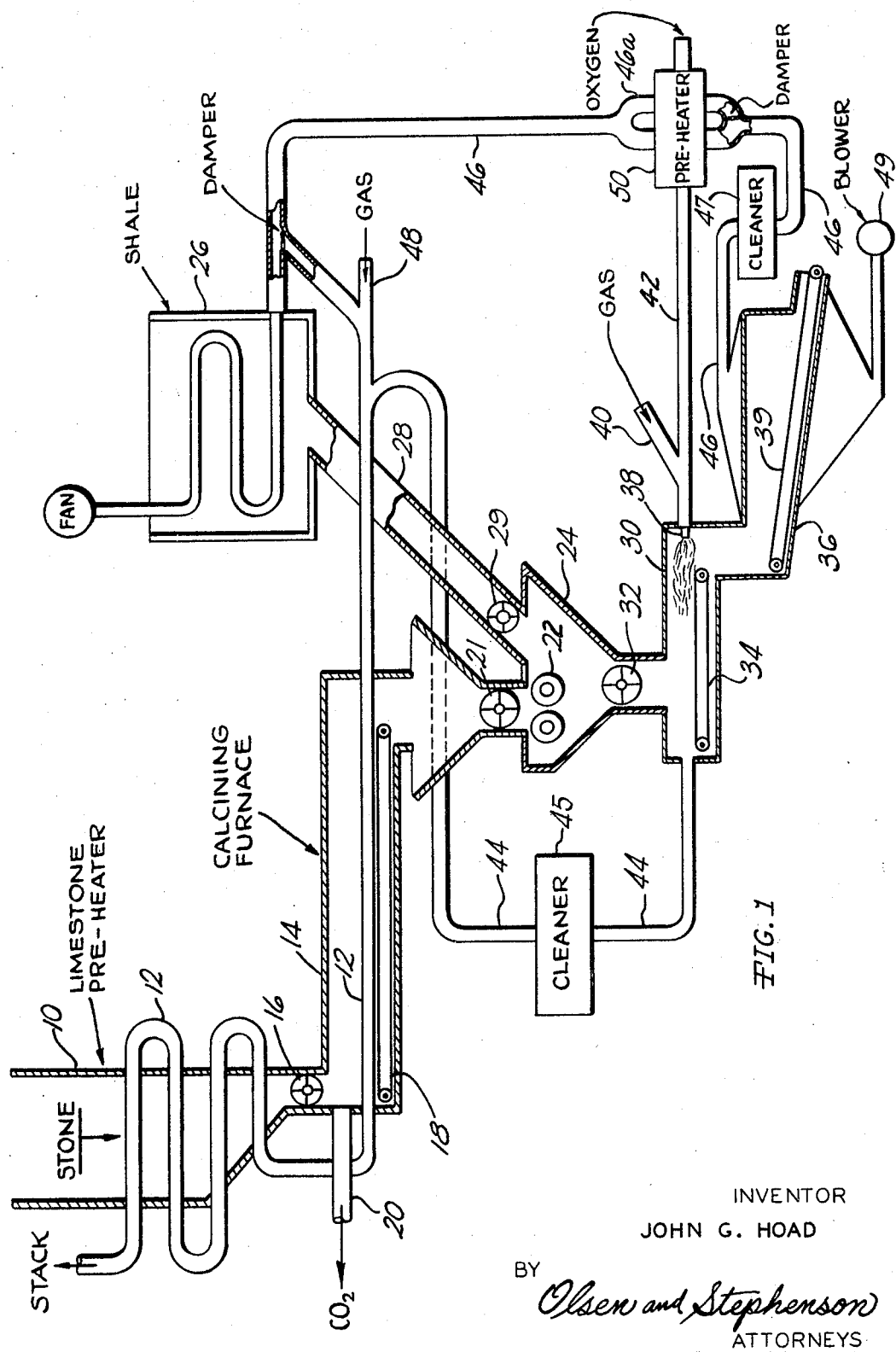

1

3,445,550
METHOD OF MAKING CEMENT
John G. Hoad, Dearborn, Mich., assignor to John G.
Hoad & Associates, Inc., Ypsilanti, Mich., a corporation of Michigan
Filed July 21, 1967, Ser. No. 655,198
Int. Cl. C04b 7/44, 1/00; F21b 7/00
U.S. Cl. 263—53                                 10 Claims

ABSTRACT OF THE DISCLOSURE

A method of producing portland cement clinker and carbon dioxide which includes heating limestone by radiant heat to separate therefrom and collect carbon dioxide, blending the remaining lime with argillaceous and siliceous material, heating the blend mixture by a direct fire to a state of incipient fusion to form clinker, cooling the clinker, utilizing the hot exhaust gases from the direct fire to supply part of the radiant heat for heating the limestone, and utilizing other heat exchange advantages to provide maximum thermal efficiency.

Background of the invention

Portland cement clinker is comprised of a mixture of lime and argillaceous and siliceous material brought to a state of incipient fusion. The conventional method of manufacturing involves the blending of limestone and argillaceous and siliceous material in the proper proportions, grinding this mixture very finely and bringing it to a point of incipient fusion in a direct fired rotary kiln. The kiln is usually divided into three general zones, namely; the heating zone; the calcining zone wherein the carbon dioxide is driven from the limestone and mingles with the products of combustion; and the burning zone where the mixture is clinkered. This conventional procedure has several drawbacks, one of the most significant is the complete loss of carbon dioxide which is driven from the limestone and mixed with the combustion gases. Other disadvantages of the prior art procedures include poor fuel economy in the clinkering furnace because of the large size of furnace required, high cost of furnace and auxiliary equipment, and the like.

Summary of the invention

In carrying out the present invention several components are used, namely; a limestone preheater; a calcining furnace; a crushing and blending facility whereby in the hot lime from the calcining furnace is crushed and a finely ground dried argillaceous and siliceous material is blended with it in the proper proportions; a clinkering furnace and a clinker cooler-recuperative air heater: Initially, the limestone is crushed to a relatively coarse particle size, and is preheated in either an open or a closed preheater by hot exhaust gases emanating from the heating elements from the calcining furnace. The preheated limestone is then conducted into and through the calcining furnace where the carbon dioxide is driven from it by heat from radiant tubes or some means other than by direct flame and related products of combustion. Since the carbon dioxide is not contaminated by the heat source, it is in a substantially pure state and is collected. The hot lime is discharged from the calcining furnace where it is crushed to a finely divided state by a suitable means such as a roll-crusher. A finely ground, dried argillaceous and siliceous material, such as shale or dried clay is blended with the lime in the proper proportion and the blended mix is discharged into the clinkering furnace. The mix is conducted through the clinkering furnace wherein it is exposed directly to a hot flame and related products of combustion to bring it to a state of incipient fusion. The hot clinker thus produced is discharged from the clinker furnace to a conventional clinker cooler, and after cooling, it can be ground into portland cement.

The clinkering furnace, which requires the highest temperature, is direct-fired with hydrocarbon fuels, such as gas or oil, and oxygen, thus providing a hot flame. In the preferred arrangement of the apparatus used in conjunction with this invention, heat for the radiant tubes in the calcining furnace comes from three sources, namely; hot exhaust gases from the clinkering furnace; heated air from the clinker cooler; and a flame comprised of hydrocarbons burned in conjunction with some of the heated air from the clinker cooler. Also, in the preferred embodiment, all of the hot gases from the radiant tubes of the calcining furnace pass through the limestone preheater. The heated air from the clinker cooler may also be used to preheat the oxygen to the clinkering furnace and also to preheat argillaceous and siliceous material being introduced through the blending apparatus.

It is an object of the present invention to provide an improved process for making cement which is characterized by the efficient use that is made of heat energy, and which simultaneously produces commercial grades of carbon dioxide and portland cement clinker.

Other objects of this invention will appear in the following description and appended claims, reference being had to the accompanying drawing forming a part of this specification wherein like reference characters designate corresponding parts in the several views.

The figure is a schematic diagram illustrating an arrangement suitable for carrying out the method of the present invention.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or teminology employed herein is for the purpose of description and not of limitation.

Referring now to the drawing, apparatus schematically shown for carrying out the method of the present invention will now be described. A limestone preheater 10 is positioned in heat exchange relation to the hot gas conduit 12 which is arranged to discharge to the stack for cleaning and discharge to atmosphere. Adjacent to the lime preheater 10 is a calcining furnace 14 which is arranged to receive the preheated limestone which is fed into the calcining furnace by the feed mechanism 16. The limestone will be advanced through the calcining furnace 14 by means of any conventional conveyor mechanism 18 and will be heated by radiant heat from the conduit 12, thereby driving off the carbon dioxide from the limestone. By virtue of the fact that the tube or conduit 12 is closed, none of the products of combustion from the source of heat will contaminate the carbon dioxide, and the latter will be withdrawn from the calcining furnace 14 via the conduit 20 and will be in a substantially pure state, free from products of combustion and also free from contamination from the atmosphere. The lime which forms the residue in the calcining furnace 14 will be delivered from the end of the conveyor means 18 to the feed mechanism 21 for discharge to the roll crushers 22 and into the blending mechanism 24.

The blending mechanism 24, details of which are not shown, is also in communication with the hopper 26 into which shale or other suitable argillaceous and siliceous material can be deposited and fed via the conduit 28 and feed mechanism 29 into the blending mechanism 24.

Positioned adjacent to the blending mechanism 24 is a clinkering furnace 30 which is adapted to receive the blended mixture from the blending mechanism 24 by operation of the feed mechanism 32. The clinkering furnace 30 has a suitable conventional conveyor mechanism 34 for advancing the blended lime and argillaceous and siliceous material to a clinker cooler 36. The clinkering furnace 30 is constructed to employ a flame nozzle 38 for introducing a hot flame from hydrocarbon fuels and oxygen to the interior of the clinkering furnace so as to heat the mixed blend to a state of clinker or incipient fusion. The clinker cooler 36 is also provided with a conventional conveyor mechanism 39 adapted to transfer the clinkers to the discharge end for grinding into portland cement.

From the foregoing description, the flow of material through the apparatus is believed clear. It will be understood that the limestone is only crushed and not ground when introduced into the calcining furnace 14. The limestone can be preheated from approximately 60° F. to approximately 1,000° F. either in an open or closed preheater by the hot exhaust emanating from the heating elements from the calcining furnace. The preheated limestone is conducted in and through the calcining furnace where the radiant heat at about 1,650° F. applied to it is such that the carbon dioxide is driven from it by means other than a direct flame. Since the carbon dioxide is not contaminated by the heat source, it is in a useably pure state. The hot lime is discharged from the calcining furnace where it is crushed to a finely divided state by a suitable means such as the shown roll crusher. This crushing to a finely divided state can be accomplished at far less expense than when it is in the form of limestone. A finely ground, dry argillaceous and siliceous material, such as shale or dry clay, is blended with the lime in the conventionally proper proportions and the mixture, at a temperature of about 1,000° F., is fed into the clinkering furnace 30. The mixture is conducted through the clinkering furnace where it is exposed to a hot flame of about 6,000° F. and related products of combustion to bring it to a state of incipient fusion of about 2,800° F., and the hot clinker is then discharged from the clinkering furnace into a clinker cooler. After cooling, the clinker is then ground into portland cement.

The heat flow through the various components of the described apparatus will be described now. It will be described sequentially, beginning at the highest level and ending at the lowest level of heat.

The clinkering furnace 30, which requires the highest temperature, is direct fired with gas or oil and oxygen which are supplied, respectively, through the conduits 40 and 42. The arrangement shown not only provides a hot flame in the region of 6,000° F., but also permits the clinkering furnace 30 and its related fans, ducts, and other accessories to be substantially smaller than is usually the case with conventional equipment.

Heat for the radiant tube 12 which passes through the calcining furnace 14 comes from three sources, namely; hot exhaust gases from the clinkering furnace 30 via the conduit 44 and gas cleaner or purifier 45; heated air from the clinker cooler 36 via conduit 46 and air cleaner 47, said air being supplied initially from the blower 49 which blows the air through the clinkers upward to the hood in the inlet end of the conduit 46; and a flame comprised of gas or oil burned in conjunction with some of the heated air from the clinker cooler, such gas or oil being supplied through conduit 48 and supplemented with a portion of the hot air from conduit 46. This gas or oil fired flame not only supplies a portion of the radiant heat for the calcining furnace, but also provides the necessary temperature control in the calcining furnace.

All of the exhaust gases from the radiant tube 12 of the calcining furnace 14 pass in heat exchange relationship through the limestone preheater 10 and most of the heat therein is transferred to the limestone in counter-current flow. If desired, this heat transfer may be effected either by the indirect arrangement shown in the drawing or by direct contact with the relatively coarse limestone. The exhaust gases from the preheater are collected and cleaned again if necessary before discharge to the atmosphere.

As previously explained, the clinker cooler 36 has cooling air delivered thereinto by the blower 49, and such operation serves to heat this air which may then be cleaned at the cleaner 47 and used partially to preheat the oxygen passing through conduit 42 by making use of conduit 46a and the oxygen preheater 50, and subsequently, the heated air in conduit 46 may be used partially to preheat the argillaceous and siliceous material passing through the hopper 26 with the remainder of such air being mixed with the gas in conduit 48 and the exhaust gases which flow through conduit 44.

From the foregoing description it will be obvious that many advantages are derived from the method of making cement described herein. Initially it will be apparent that recovery of carbon dioxide of commercial quality is realized and arrangement is provided for driving off deleterious alkali-laden gases from the clinker; a much smaller clinkering kiln or furnace can be provided with resultant better fuel economy; lower furnace and auxiliary equipment cost; and the like.

Having thus described my invention, I claim:

1. In the manufacture of portland cement the method of producing cement clinker and carbon dioxide, comprising the steps of introducing limestone into a calcining furnace in a relatively contaminant-free environment, heating the limestone by radiant heat means in said furnace to a sufficient temperature to separate from the limestone carbon dioxide in a relatively contaminant-free state, collecting said carbon dioxide in its relatively contaminant-free state, blending the remaining hot lime with a dry argillaceous and siliceous material, introducing the blended mixture into a clinkering furnace and heating the same by a direct fire to a state of incipient fusion, passing the fused material to a clinker cooler, passing the hot exhaust gases from the clinkering furnace to the radiant heat means of the calcining furnace to supply a portion of radiant heat to the limestone, and supplementing said hot exhaust gases with a hydrocarbon flame to control the temperature of the radiant heat means and thereby the temperature in the calcining furnace.

2. The method according to claim 1, wherein said limestone is initially preheated by said exhaust gases after the latter have passed through the radiant heat means in said calcining furnaces, and the preheated limestone is introduced into said calcining furnace.

3. The method according to claim 2, wherein said limestone is crushed to a relatively coarse state prior to being introduced into said preheater, and the hot lime from the calcining furnace is crushed to a relatively finer state prior to blending with the argillaceous and siliceous material.

4. The method according to claim 1, wherein air is passed through said clinker cooler as a cooling medium, and hydrocarbon fuel is provided to supply at least a portion of said heat from the radiant heat means, said air which is thus heated at the clinker cooler being introduced into said hydrocarbon fuel.

5. The method according to claim 4, wherein the heated air prior to being introduced into said hydrocarbon fuel is passed in heat-exchange relationship to said argillaceous and siliceous material before the latter is blended with the hot lime.

6. The method according to claim 1, wherein hydrocarbon fuel is provided to produce said direct flame in the clinkering furnace and oxygen is introduced into said fuel.

7. The method according to claim 6, wherein air is passed through said clinker cooler as a cooling medium, and the air which is thus heated is passed in heat transfer relationship to said oxygen before the latter is introduced into said fuel.

8. The method according to claim 7, wherein after said air is passed in heat transfer relationship to said oxygen it is passed in heat transfer relationship to said argillaceous and siliceous material before the latter is blended with the hot lime.

8. The method according to claim 8, wherein hydrocarbon fuel is provided to supply at least a portion of said radiant heat, and said air after passing said argillaceous and siliceous material is introduced into said hydrocarbon fuel.

10. In the manufacture of portland cement, the method of producing cement clinker and carbon dioxide, comprising the steps of preheating crushed limestone, introducing the preheated limestone into a calcining furnace and heating the limestone by an indirect hydrocarbon flame to a sufficient temperature to separate carbon dioxide from the limestone, collecting said carbon dioxide, crushing the remaining lime to a relatively smaller particle size than said crushed limestone, preheating ground argillaceous and siliceous material of essentially the same particle size as said crushed lime and blending said lime and argillaceous and siliceous material, introducing the blended material into a clinkering furnace and heating the same to a state of incipient fusion by a direct flame produced by mixture of a hydrocarbon fuel and oxygen, passing cooling air in heat exchange relationship to the fused material, passing said air after being heated by said fused material to said indirect hydrocarbon flame at said calcining furnace, passing the hot exhaust gases from said clinkering furnace to said indirect flame, preheating the oxygen to said clinkering furnace and the argillaceous and siliceous material for blending with said lime by passing said heated air in heat transfer relationship therewith before such air is passed to said indirect hydrocarbon flame, and preheating said limestone with all of the hot gases from said indirect heating at said calcining furnace.

References Cited

UNITED STATES PATENTS

| | | | |
|---|---|---|---|
| 999,492 | 8/1911 | Ellis | 263—32 |
| 1,468,168 | 9/1923 | Pike | 263—32 |
| 3,074,707 | 1/1963 | Humphries et al. | 263—53 |

JOHN J. CAMBY, *Primary Examiner.*

U.S. Cl. X.R.

263—32